United States Patent [19]

Iwaibana et al.

[11] Patent Number: 5,200,834
[45] Date of Patent: Apr. 6, 1993

[54] MAGNETIC RECORDING AND REPRODUCING APPARATUS OBTAINING SEPARATE CLOCK SIGNALS FROM BRIGHTNESS AND COLOR COMPONENTS OF A VIDEO SIGNAL

[75] Inventors: Kunio Iwaibana, Osaka; Takeshi Kuwajima, Tokyo, both of Japan

[73] Assignees: NEC Home Electronics Ltd., Osaka; NEC Corporation, Tokyo, both of Japan

[21] Appl. No.: 330,406

[22] Filed: Mar. 30, 1989

[30] Foreign Application Priority Data

Mar. 30, 1988 [JP] Japan .................................. 63-77288
Apr. 30, 1988 [JP] Japan .................................. 63-108264

[51] Int. Cl.$^5$ ................................................ H04N 9/89
[52] U.S. Cl. .................................... 358/324; 358/310
[58] Field of Search ............... 358/310, 320, 323, 324, 358/325, 330, 19, 22 R, 13, 326

[56] References Cited

U.S. PATENT DOCUMENTS

| | | | |
|---|---|---|---|
| 4,123,774 | 10/1978 | Hjortzberg | 358/320 |
| 4,217,603 | 8/1980 | Hjortzberg | 358/310 |
| 4,524,380 | 6/1985 | Shibata et al. | 358/316 |
| 4,626,929 | 12/1986 | Ichinoi et al. | 358/310 |
| 4,677,497 | 6/1987 | Yoshinaka | 358/310 |
| 4,698,694 | 10/1987 | Tomita et al. | 358/326 |
| 4,736,238 | 4/1988 | Moriyama et al. | 358/310 |
| 4,757,390 | 7/1988 | Mehrgardt et al. | 358/310 |
| 4,774,594 | 9/1988 | Urata | 358/310 |
| 4,807,048 | 2/1989 | Yasuda | 358/310 |

FOREIGN PATENT DOCUMENTS

| | | | |
|---|---|---|---|
| 0140716 | 5/1985 | European Pat. Off. | |
| 6086992 | 5/1987 | Japan | 358/330 |

OTHER PUBLICATIONS

Patent Abstracts of Japan, vol. 10, No. 27, JP-A-60-187195 (Sony, K.K.).
Patent Abstracts of Japan, vol. 9, No. 288, JP-A-60-127894 (Matsushita Denki, Sangyo K.K.).

Primary Examiner—Jeffery A. Brier
Assistant Examiner—Thai Tran
Attorney, Agent, or Firm—Cushman, Darby & Cushman

[57] ABSTRACT

A digital video tape recorder. A clock is extracted from the horizontal sync signal within the luminance signal, and used in processing the luminance portion of the video signal. A clock is also extracted from a color burst within the chrominance signal and is used for processing the chrominance portion. The chrominance portion of the video signal to be recorded is converted to a low frequency band before recording. During playback, the reverse of this operation is performed, thereby producing a signal with the original color frequency.

2 Claims, 3 Drawing Sheets

MAGNETIC RECORDING AND REPRODUCING APPARATUS OBTAINING SEPARATE CLOCK SIGNALS FROM BRIGHTNESS AND COLOR COMPONENTS OF A VIDEO SIGNAL

BACKGROUND AND SUMMARY OF THE INVENTION

The present invention relates to a magnetic record reproducing apparatus in which digital signal processing is produced during magnetic recording or reproduction of a video signal, and in particular to a reproducing system for a chrominance signal in a digital video tape recorder.

FIG. 3 shows a magnetic record reproducing apparatus 101 in which the video signal processing required to reproduce a magnetic record is performed on digitized signals. A composite video signal Y+C is composed of luminance signal Y and chrominance signal C, and is provided to A/D converter 103 through change-over switch 102. The position of switch 102 depends on whether the device is in record (R) or reproducing (play or P) mode. The composite video signal is converted to a digital signal by A/D converter 103 and is supplied to digital signal processing circuit 104. Digital signal processing circuit 104 processes the signal to modulate a frequency of luminance signal Y. The video signal processed by digital signal processing circuit 104 is converted to an analog signal by D/A converter 105 and thereafter is supplied to rotary magnetic head 107 through changeover switch 106, switched depending on whether the device is in the record or play mode, and is then recorded on or reproduced from magnetic tape 108.

The video signal read out from magnetic tape 108 by rotary magnetic head 107 is supplied to digital signal processing circuit 104 through changeover switch 102 and A/D converter 103, thereby performing a signal processing which is the reverse of the processing at the recording time with respect to the video signal. The composite video signal thus digitized is converted to an analog signal by D/A converter 105 and thereafter is supplied to an external monitor 199 to display the image received through changeover switch 106.

In the above-mentioned conventional magnetic record reproducing apparatus 101, luminance signal Y and chrominance signal C are A/D-converted, as they are composite video signals. Accordingly, it is necessary to dispose a luminance chrominance separating circuit, an automatic gain control (AGC) circuit or an automatic color gain control (ACC) circuit, etc., within digital signal processing circuit 104. Therefore, this digital signal processing circuit 104 has included a large amount of circuitry to effect these functions, and therefore has tended to be large in size. Further, when a sampling frequency suitable for the signal processing of both the luminance signal and the chrominance signal is selected, the band from which the sampling frequency in A/D converter 103 can be selected becomes narrowed. Further, an output of a tuner circuit for selecting a television signal to be magnetically recorded is varied by this selection of a proper sampling frequency, and it is sometimes difficult to maintain the quality of the chrominance signal using the automatic color gain control circuit when the voltage level of the chrominance signal is reduced. Further, when a clock signal required to perform the sampling operation of the video signal is set to have a frequency which is an integer times a color subcarrier frequency but is not phase-locked with a horizontal synch signal, it is not possible to perform noise reduction of a cyclic type utilizing line correlation and frame correlation, or to perform special image processing for providing a special effect such as a strobe effect, a mosaic effect, a solarization effect, or the like.

To solve the problems discussed above, the present invention proposes a magnetic record reproducing apparatus comprising a pair of A/D converters for respectively digitizing luminance and chrominance signals as components of an analog composite video signal, a digital signal processing circuit for receiving the luminance and chrominance signals digitized by the pair of A/D converters and processing the signals for modulating a frequency of the luminance signal and for converting a frequency of the chrominance signal into a low frequency band, and a D/A converter for receiving the luminance signal modulated with respect to the frequency and the chrominance signal converted in the low frequency band, said luminance and chrominance signals being mixed with each other within the digital signal processing circuit, said D/A converter converting both signals to analog signals to perform a magnetic recording operation.

In the present invention, the luminance and chrominance signals are separately digitized and the chrominance signal is modulated with respect to frequency and the frequency of the chrominance signal is converted in the low frequency band within the digital signal processing circuit. Thereafter, these signals are mixed with each other, and the mixed signal is converted to an analog signal by the common D/A converter to perform the magnetic record operation. Accordingly, the operating burden of the digital signal processing circuit is reduced, the selecting band of a sampling frequency is secured, and the accuracy in D/A conversion by the luminance and chrominance signals is secured.

Another aspect of the invention relates to video tape recorders of the consumer type which have recently come into wide use, and especially those that make extensive use of digital technology. One such is disclosed in an article entitled "Digital Signal Processing in Video Tape Recorders" IEEE Trans. on Consumer Electronics Vol. CE-31 August 1985, for example.

This article describes system clock signals for the respective digital circuits being formed by an independent oscillating circuit irrespective of any correlation with respect to a horizontal synch signal of an input video signal or a color subcarrier signal. The frequency of the system clock signal is selected independent of a horizontal synchronization frequency and a color subcarrier frequency.

However, in such a video tape recorder which uses a system clock signal with a frequency having no correlation with the input video signal, it is difficult to perform signal processing with proper correlation to the video signal (television signal) for the following reasons.

(a) It is possible to reduce noise using a frame correlation. However, if this is done, it is necessary that the positions of a picture element on horizontally and vertically two dimensional planes of the video signal are equal to each other before and after one frame, but are not aligned with each other when the system clock signal having no correlation with the video signal is used.

(b) It is well known that, when a chrominance signal component of the video signal as in NTSC, PAL or SECAM systems, etc. is converted to a primary chrominance signal, the circuitry can be made smaller-sized by performing a sampling operation by the system clock signal having a frequency four times the color subcarrier frequency phase-locked with respect to a color burst signal. However, such a method cannot be used with a system clock signal having no correlation mentioned above.

It has also been to use a system clock signal phase-locked with the horizontal synch signal and the color subcarrier signal and having a frequency an integer times the horizontal synch frequency or the color subcarrier frequency as in the case in which the system clock signal is used in a digital television image receiver and a video tape recorder for business.

However, the frequency of such a system clock signal is high and the respective circuits are complicated and large in size, so that it is not sufficient to just apply the system clock signal to a known video tape recorder.

The second aspect of the present invention has an object of providing a consumer—type video tape recorder simplified in construction as much as possible when the recorder is converted to digital technology.

To solve the problems mentioned above, the present invention defines a digital video tape recorder for picking up and reproducing, from a magnetic tape, a video signal in which a chrominance signal is converted to a low frequency band, said tape recorder being characterized in that a clock signal synchronized with a color burst signal of said picked-up video signal and having a frequency $4 \times N$ (where N is a natural number) times a carrier frequency converted into the low frequency band is applied as a clock signal with respect to a circuit constituting at least a portion of a chrominance signal reproducing system.

The clock signal with respect to a digital circuit (including an analog/digital converting circuit) for processing the chrominance signal converted into the low frequency band is synchronized with the color burst signal of the picked-up video signal and has the frequency $4 \times N$ (where N is a natural number) the carrier frequency converted into the low frequency band. Accordingly, it becomes possible to process the video signal while maintaining a correlation with the clock signal, and a color difference signal component can be determined even when the chrominance signal is converted into the low frequency band, thereby simplifying the signal processing.

DESCRIPTION OF THE PREFERRED EMBODIMENT

A first embodiment of the present invention will now be described in detail with reference to FIG. 1.

Figure 1:
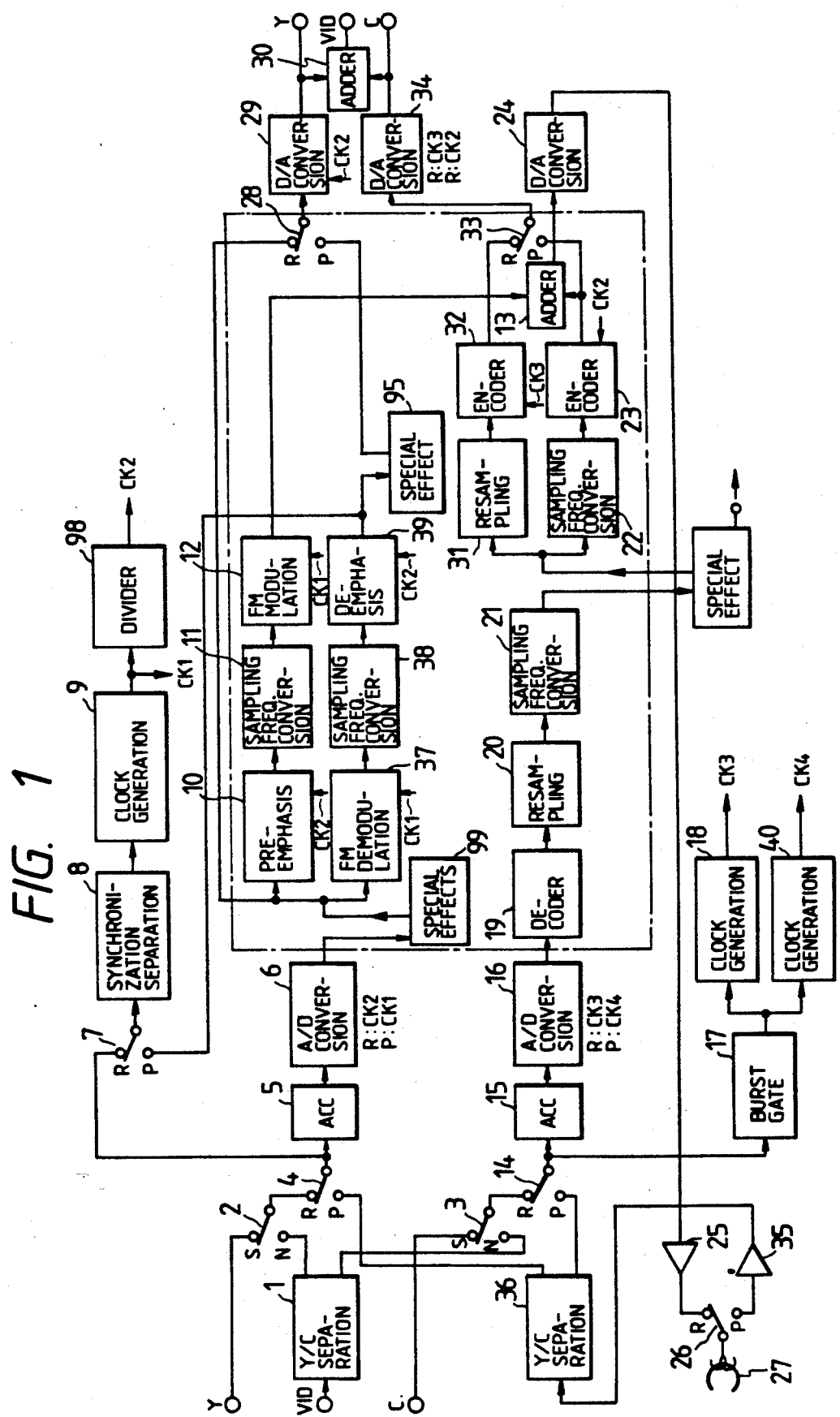
FIG. 1 is a block diagram showing a first embodiment of a digital video tape recorder in accordance with the present invention.

FIG. 1 shows a basic processing construction of a digital video tape recorder in which a digital processing portion is marked and surrounded by one-dot chain line.

A recording operation will first be described.

In this embodiment, an input operation can be performed by separating signals of the composite video signal VID into a luminance signal Y and chrominance signal C, or by using separated signals. The input composite video signal VID is separated and divided in Y/C separating circuit 1 into the luminance signal and the chrominance signal and these signals are respectively provided to input change-over switches 2 and 3. Input change-over switches 2 and 3 each have one input connected to Y/C separating circuit 1 in a composite video signal input mode, to thereby select the luminance and chrominance signals separated and provided by the Y/C separating circuit in this mode. FIG. 1 shows a state in which a separate input signal (that is, not a composite) is selected.

The luminance signal selected by input change-over switch 2 is provided in parallel to automatic gain control (AGC) circuit 5 through a record mode terminal of record reproducing change-over switch 4, to synchronization separating circuit 8. The luminance signal is provided through record reproducing change-over switch 4 and to synchronization separating circuit 8. AGC 5 ensures constant gain of the luminance signal is. The luminance signal provided through record reproducing change-over switch 4 to synchronization separating circuit 8, in parallel with the branch coupled to AGC 5, through a record mode terminal of record reproducing change-over switch 7. Synchronization separating circuit 8 separates the horizontal synch signal included within the luminance signal and provides the separated signal to first clock generating circuit 9. First clock generating circuit 9 is constructed by a phase locked loop (PLL) for example, and forms and outputs first clock signal CK1 synchronized with the horizontal synchronization signal and having frequency 1440FH (1440 times the horizontal synchronization frequency FH). A second clock signal CK2 having half the frequency (720FH) is formed by a ½ frequency dividing circuit 98 from first clock CK1.

In a record mode, the output of AGC 5 is connected to A/D converter 6. A/D converter 6 converts the luminance signal from an analog to a digital signal, in sync with second clock signal CK2 obtained from the H-sync within the luminance signal. The digitized luminance signal may be provided to a circuit 99 for providing special effects for the luminance signal. After the special effects are provided to the luminance signal, this signal is provided to pre-emphasis circuit 10.

Pre-emphasis circuit 10 emphasizes a high frequency band of the luminance signal using second clock signal CK2. The pre-emphasized luminance signal is then converted to a signal having double the sampling frequency 1440FH using sampling frequency converter 11, and is provided to FM modulating circuit 12.

FM modulating circuit 12 must process the signal using a clock signal having $2 \times CK2 = CK1$. Circuit 12 performs a pre-processing for an FM modulation such as a clamp processing, etc., and an FM-modulating processing using the first clock signal CK1, and provides the FM-modulated luminance signal to adder 13 which is used to synthesize the final video signal.

The chrominance signal provided through input change-over switch 3 provided is in parallel to burst gate circuit 17 and to automatic color gain control (ACC) 15 through a record mode terminal of record reproducing change-over switch 14. The chrominance signal adjusted by automatic chrominance adjusting circuit 15 with respect to the chrominance is provided to analog/digital converting circuit 16.

The chrominance signal provided through record reproducing change-over switch 14 is further provided to burst gate circuit 17. A color burst signal is extracted from the chrominance signal by burst gate circuit 17 and the extracted chrominance signal is provided to second clock generating circuit 18. Clock generating circuit 18 is constituted by a PLL for example, and forms and outputs a third clock signal CK3 synchronized with the color burst signal and having a frequency 4FSC (four times color subcarrier frequency FSC).

Third clock signal CK3 is provided to analog/digital converting circuit 16 in which the chrominance signal is analog/digital-converted according to clock signal CK3, and the digitized chrominance signal is provided to decoder circuit 19. Since the chrominance signal is analog/digital-converted according to third clock signal CK3 having frequency 4FSC, color difference signal components R-Y, B-Y, -(R-Y) and -(B-Y) are sequentially produced with respect to the chrominance signal converted to the digital signal. Decoder circuit 19 decodes these color difference signal components.

The color difference signal components thus decoded are provided to a circuit for providing special effects 97 (including noise reduction, etc.) through resampling circuit 20 and sampling frequency converter 21. This enables special effects to be provided for the color difference signal components. Resampling circuit 20 and sampling frequency converter 21 are circuits for conforming these components to processing frequencies in the circuit for providing the special effects 97.

The color difference signal components provided with special effects are provided to second sampling frequency converter 22 for conversion of sampling frequencies, and are then provided to encoder circuit 23. Encoder circuit 23 is a circuit having therein a converting table for example, which encodes the color difference signal components to chrominance signals and converts the encoded signals to signals in a low frequency band in accordance with second clock signal CK2. Data is stored in the converting table such that, when a high frequency signal component is provided, this component is converted to a signal component in the low frequency band, and when a low frequency signal component is provided, this signal component is converted to a signal component in the high frequency band. The converting table is constructed such that conversion to the low frequency of a chrominance signal is performed in the record mode to be recorded on a tape. The low frequency converted chrominance signal is returned to a chrominance signal component having the original color subcarrier frequency, in the reproducing mode described later. The chrominance signal thus converted into the low frequency band is provided to adder 13.

Synthesizing circuit 13 synthesizes together the luminance signal and the chrominance signal converted into the low frequency band and forms a signal to be recorded. The recorded signal output from adder 13 is a digital signal and is converted to an analog signal according to first clock signal CK1 by digital/analog reconverting circuit 24. Thereafter, the record signal is amplified through record preamplifying circuit 25 and is provided to video head 27 through a record mode terminal of record reproducing change-over switch 26 and is then recorded on a magnetic tape.

Even when the recording operation is being performed, the video signal can still be output from the video output terminal to the exterior of the apparatus.

The digital luminance signal, converted by analog/digital converting circuit 6 and provided with special effects by circuit 99 is also provided in parallel to digital/analog converter circuit 29 through a record mode terminal of record reproducing change-over switch 28. Second clock signal CK2 is provided to digital/analog converting circuit 29 and this circuit outputs an analog luminance signal by digital to analog converting the clock signal CK2. This embodiment provides separate output terminals for separate output of the luminance signal and the chrominance signal, and for output of a composite video signal. The analog luminance signal is provided to a luminance output terminal for separation and output and is also provided to 30.

A resampling operation is performed in resampling circuit 31 with respect to the color difference signal components decoded by decoder circuit 19 and provided with any special effects by the special effects providing circuit 97 through resampling circuit 20 and sampling frequency converter 21. Thereafter, the color difference signal components are provided to encoder circuit 32. Third clock signal CK3 is provided to encoder circuit 32 at this time. Encoder circuit 32 converts each of the color difference signal components to a chrominance signal by encoding according to clock signal CK3 and provides the chrominance signal to digital/analog converting circuit 34 through a record mode terminal of record reproducing change-over switch 33. Third clock signal CK3 is provided to digital/analog converting circuit 34 at this time. Digital/analog converting circuit 34 digital/analog-converts the chrominance signal according to clock signal CK3, and outputs the chrominance signal converted to the analog signal. This chrominance signal is outputted to the analog signal. This chrominance signal is outputted as a separating output signal through a chrominance signal output terminal and is then provided to adder 30 mentioned above. Adder 30 synthesizes the luminance signal and the chrominance signal and converts these signals to a composite video signal, and the composite video signal is then outputted to the exterior of apparatus through a composite video signal output terminal.

The chrominance signal outputted to the exterior of the apparatus is obtained by encoder circuit 32 instead of encoder circuit 23 since the chrominance signal obtained from encoder circuit 23 is converted to a signal into the low frequency band and an external equipment is not constructed such that the chrominance signal converted into the low frequency band is processed.

A reproducing operation will next be described.

A video signal picked up from a magnetic tape by video head 27 is provided and amplified by reproducing preamplifying circuit 35 through a reproducing mode terminal of record reproducing change-over switch 26. Thereafter, the video signal is provided to Y/C separating circuit 36. Y/C separating circuit 36 separates and divides the provided video signal into a luminance signal and a chrominance signal. Two separate Y/C separating circuits are necessary, one for the recording system and another Y/C separating circuit 36 for the reproducing system. A separate Y/C circuit 36 is necessary since the chrominance signal of the reproduced video signal has been converted to a signal into the low frequency band and therefore cannot be commonly used.

The luminance signal separated by Y/C separating circuit 36 is provided to automatic gain control circuit 5 through a reproducing mode terminal of record reproducing change-over switch 4. Thus, the gain of the luminance signal is controlled to be constant and the luminance signal is thereafter provided to analog/digital converting circuit 6. In the reproducing mode, first clock signal CK1 is provided to analog/digital converting circuit 6. Analog/digital converting circuit 6 analog to digital converts the luminance signal according to first clock signal CK1 and provides this signal to the special effect providing circuit similar to the case of the record mode.

The luminance signal provided with special effects (including drop-out correction) by the special effects providing circuit 99 is provided to FM demodulating circuit 37. First clock signal CK1 is provided to FM demodulating circuit 37 at this time. FM demodulating circuit 37 performs a pre-processing for demodulation such as a limit processing, etc., and an FM demodulating processing according to first clock signal CK1, and provides the demodulated luminance signal to sampling frequency converter 38. Sampling frequency converter 38 divides the sampling frequency by one-half, and provides this converted signal to de-emphasis circuit 39. De-emphasis circuit 39 performs a processing that is the reverse to the processing of pre-emphasis circuit 10—it retranslates a luminance signal component into the high frequency band and provides the luminance signal to special effects providing circuit 95.

The luminance signal thus FM-demodulated and provided with the special effects is provided to digital/analog converting circuit 29 through a reproducing mode terminal of record reproducing change-over switch 28, and is converted to an analog signal. The luminance signal is then outputted to the exterior of the apparatus through a luminance signal output terminal and is provided to adder 30.

In the reproducing mode, the luminance signal outputted from de-emphasis circuit 39 is provided to synchronization separating circuit 8 through a reproducing mode terminal of record reproducing change-over switch 7. Thus, first clock signal CK1 is formed by synchronization separating circuit 8 and first clock generating circuit 9.

On the other hand, the chrominance signal separated by Y/C separating circuit 36 is provided to automatic color gain control circuit 15 through the reproducing mode terminal of record reproducing change-over circuit 14. The level of the chrominance signal is thus adjusted automatically by this circuit 15 and thereafter is provided to analog/digital converting circuit 16. The chrominance signal provided through record reproducing changeover switch 14 is provided to burst gate circuit 17. A color burst signal extracted by burst gate circuit 17 is provided to third clock generating circuit 40. Third clock generating circuit 40 is constituted by a PLL for example, and forms fourth clock signal CK4 synchronized with the color burst signal and having frequency 4FD (four times carrier frequency FD) converted into the low frequency band.

In the reproducing mode, fourth clock signal CK4 is provided to analog/digital converting circuit 16. Analog/digital converting circuit 16 converts the chrominance signal according to fourth clock signal CK4.

In the reproducing mode, the chrominance signal converted into the low frequency band is provided to analog/digital converting circuit 16. However, the chrominance signal has a frequency four times the carrier frequency into the low frequency band and the chrominance signal is sampled by clock signal CK4 in synchronization with the color burst signal. Accordingly, even in this case, color difference signal components are produced in a sequential order R-y, B-Y -(R-Y) and -(B-Y) with respect to the chrominance signal converted to a digital signal.

The chrominance signal converted to a digital signal is provided to decoder circuit 19. In the case of the reproducing mode, fourth clock signal CK4 is provided to decoder circuit 19, and decoder circuit 19 performs a decoding processing with respect to the chrominance signal according to clock signal CK4 and separates color difference signal components from the chrominance signal.

The color difference signal components are processed in resampling circuit 20, sampling frequency converter 21 and the special effects providing circuit and frequency converter 22 similar to the case of the record mode. The processed color difference signal components are provided to resampling circuit 31. In the reproducing mode, after being resampled by the resampling circuit 31 and, therefore, converted into the high frequency band, the signal components provided to the resampling circuit 31 are converted into digital form in accordance with the clock signal 4 fsc which is four times as high as the color subcarrier frequency.

This chrominance signal is provided to digital/analog converting circuit 34 through the reproducing mode terminal of record reproducing change-over switch 33. In the case of the reproducing mode, since the chrominance signal is provided to digital/analog converting circuit 34 from encoder circuit 32, digital to analog converting circuit 34 digital to analog-converts the chrominance signal based on clock signal CK3 which is the same signal as clock signal CK3 with respect to encoder circuit 32. The chrominance signal converted to analog is outputted to the exterior of the apparatus through the separating output terminal of the chrominance signal, and is then provided to adder 30. Thus, the luminance signal and the chrominance signal are synthesized by adder 30 and the obtained composite video signal is outputted through the composite video signal output terminal.

The video signal thus reproduced from the magnetic tape is outputted in a shape in which the luminance signal and the chrominance signal are separated from the video signal. Further, the video signal is outputted in the shape of the composite video signal and is displayed by a display device and is provided and recorded to other video tape recorders.

Accordingly, in accordance with the abovementioned embodiment, the clock signals used are synchronized with the horizontal synch signal and the color burst signal making it easy to perform processing using the correlation between the signals. Further, since the clock signal with respect to the processing circuit of the chrominance signal converted into the low frequency band has a frequency four times the carrier frequency converted into the low frequency band. Accordingly, a sampling point can be set as a point at which one color difference signal component appears as it is, so that the processing construction with respect to this point can be simplified. Further, the processing construction can also be simplified since the frequency of the clock signal itself is low.

In the above-mentioned embodiment, the clock signal with respect to the processing circuit of the chrominance signal converted into the low frequency band have a frequency four times the carrier frequency converted into the low frequency band, but may have a frequency 4×N (where N is a natural number) times the carrier frequency converted into the low frequency band. Further, circuits using the clock signal relating to such a carrier frequency converted into the low frequency band ar not limited to analog/digital converting circuit 16 and decoder circuit 19 as the above embodiment, but may be circuits in another reproducing system.

As mentioned above, in accordance with the present invention, the clock signal with respect to the circuit for processing the chrominance signal converted into the low frequency band has a frequency 4×N times the carrier frequency converted into the low frequency band and is synchronized with the color burst signal of the reproduced video signal. Accordingly, it is easy to perform a processing using the correlation of the video signal, and the processing construction can be simplified. A second embodiment of a magnetic record reproducing apparatus in the present invention will now be described with reference to FIG. 2.

Figure 2:
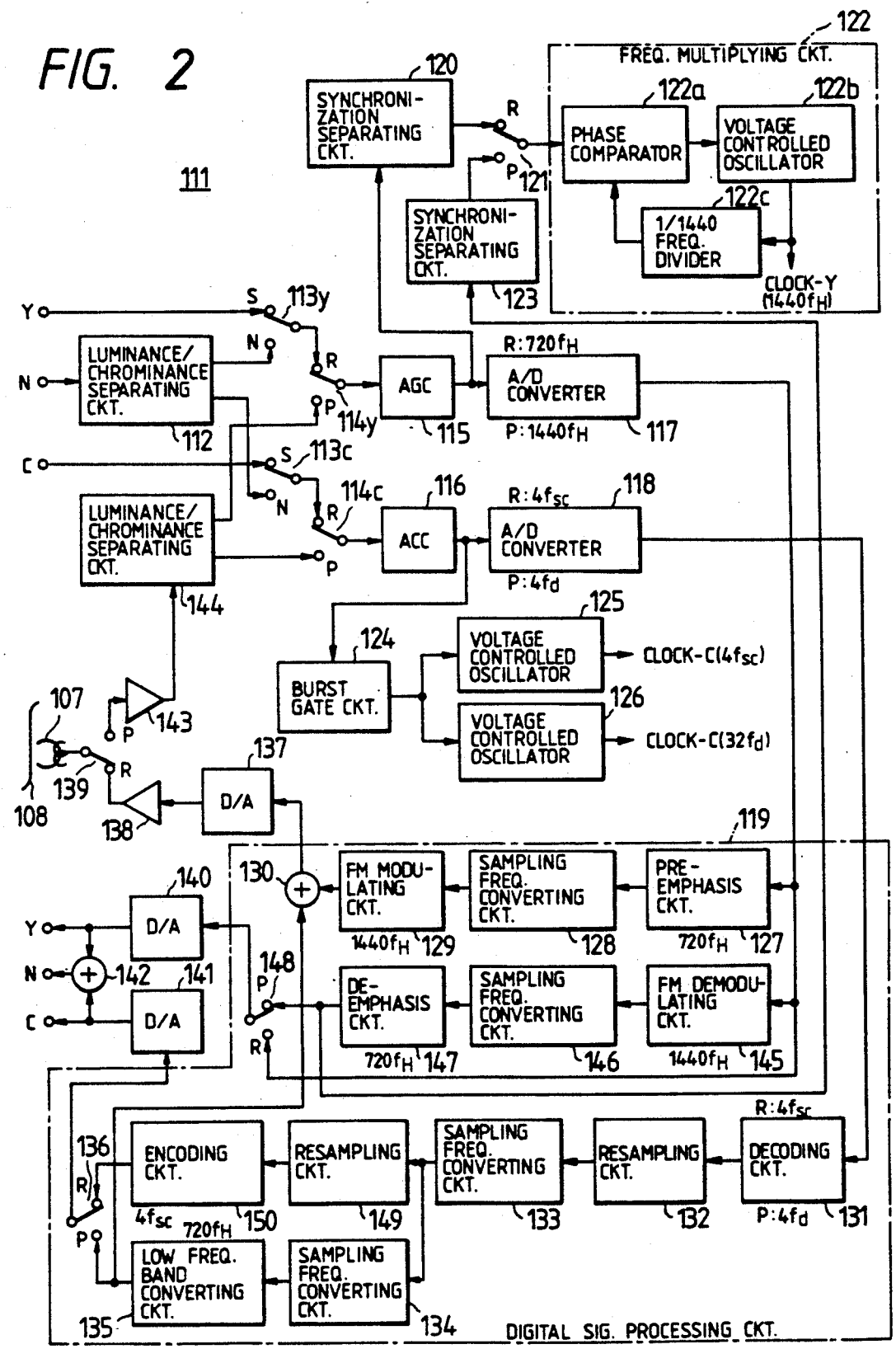
FIG. 2 is a circuit diagram showing the construction of the circuits in a magnetic record reproducing apparatus in accordance with a second embodiment of the present invention.
Figure 3:
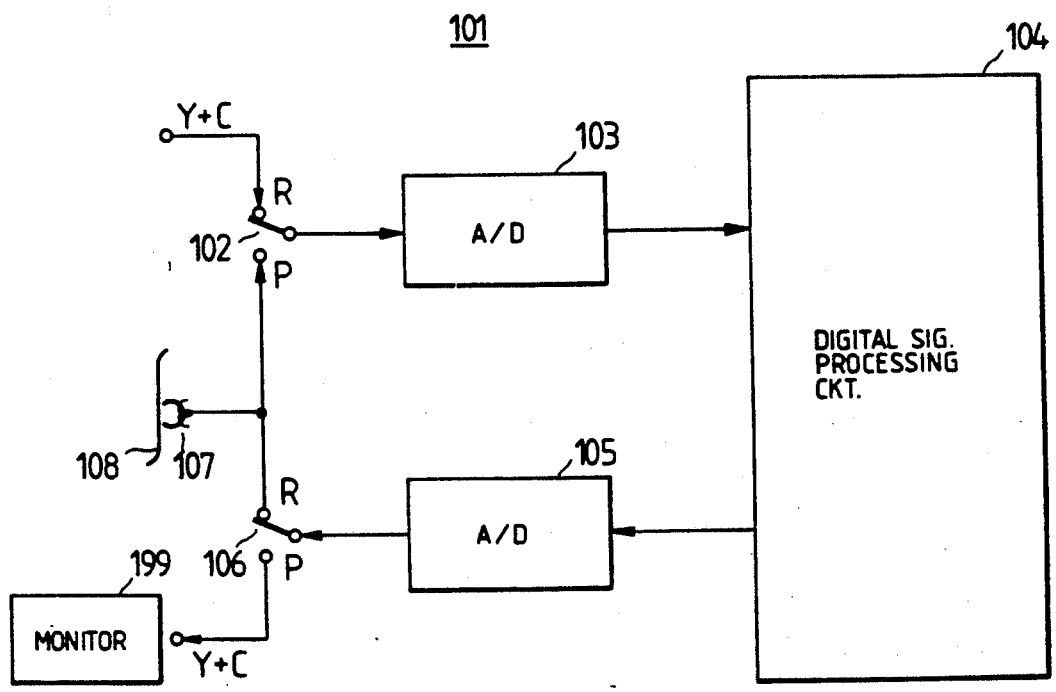
FIG. 3 is a circuit diagram showing the construction of an example of the conventional magnetic record reproducing apparatus.

FIG. 2 is a circuit diagram showing the circuit construction in one embodiment of the magnetic record reproducing apparatus of the present invention. Magnetic record reproducing apparatus 111 has an S input terminal corresponding to a luminance/chrominance separate input and an N input terminal corresponding to a luminance/chrominance composite input. A composite video signal at the N terminal is separated and divided into a luminance signal and a chrominance signal by luminance/chrominance separating circuit 112. The luminance signal is supplied to automatic gain control circuit (AGC) 115 and the chrominance signal is supplied to automatic color gain control circuit (ACC) 116 respectively through change-over switches 113y and 113c. Changeover switches are used to choose whether the composite or separated signal input is being used, and are switched in accordance with this decision. Changeover switches 114y and 114c are switched depending on whether the tape recorder is operating in record or reproducing (play) mode.

In this embodiment, automatic gain control circuit 115 and automatic chrominance gain control circuit 116 are respectively connected to digital signal processing circuit 119 through A/D converters 117 and 118 which are respectively used to convert the luminance signal and the chrominance signal.

Digital signal processing circuit 119 is generally divided into a luminance signal system and a chrominance signal system. Each of these systems is constructed by a parallel connecting circuit, having parallel dedicated circuits for record and play. Further, in this embodiment, the clock signal required to record the luminance signal is produced by supplying the horizontal synch signal, separated just after automatic gain control circuit 115 by synchronization separating circuit 120, through change-over switch 121 to frequency multiplying circuit 122.

Frequency multiplying circuit 122 is constructed by a phase-locked loop composed of phase comparator 122a, voltage controlled oscillator 122b and 1/1440 frequency divider 122c, and generates a clock signal CLOCK-Y having a frequency which is 1440 times an input horizontal synch signal. The clock signal used to reproduce the luminance signal is obtained by supplying the horizontal synch signal separated within digital signal processing circuit 119 by synchronization separating circuit 123 through change-over switch 121 to frequency multiplying circuit 122. In contrast, the clock signal CLOCK-C used to record the chrominance signal is provided by supplying a color burst signal separated just before automatic color gain control circuit 116 by burst gate circuit 124 and having a frequency multiplied by 4 or 32 times by voltage controlled oscillator 125 with a crystal oscillator or voltage controlled oscillator 126, respectively.

In record mode, the record luminance signal supplied to digital signal processing circuit 119 passes through pre-emphasis circuit 127, and the sampling frequency thereof is then converted by sampling frequency converting circuit 128 from a frequency of $720f_H$ to $1440f_H$. Thereafter, the record luminance signal is provided to FM modulating circuit 129. The luminance signal processed with respect to frequency modulation is supplied to adder 130 for mixing the luminance signal and the chrominance signal with each other. The chrominance signal is processed in parallel, and is first separated and divided into a red color difference signal and a blue color difference signal by decoding circuit 131. Thereafter, the chrominance signal is resampled by using a sampling clock signal which is phase-locked with the horizontal synch signal by resampling circuit 132, and thereafter is supplied to sampling frequency converting circuit 133. Sampling frequency converting circuits 133 and 134 are used to synchronize a sampling frequency used by digital signal processing circuit 119 with a sampling frequency used in a signal processing outside digital signal processing circuit 119, with respect to signal processing interfaces of the chrominance signal inside an outside digital signal processing circuit 119. The chrominance signal having the sampling frequency converted by sampling frequency converting circuit 134 is converted with respect to the frequency according to the sampling clock signal having a frequency $720f_H$ by low frequency band converting circuit 135 and is supplied to adder 130 as a chrominance signal converted in the low frequency band.

The luminance and chrominance signals mixed by adder 130 as digital signals are supplied from digital signal processing circuit 119 to D/A converter 137 in order to prepare to record these signals. These signals are further supplied to rotary magnetic head 107 through record amplifying circuit 138 and change-over switch 139 and are then recorded on magnetic tape 108 as analog signals.

The video signal recorded on magnetic tape 1088 is separated with respect to luminance and chrominance by D/A converters 140 and 141 for reproduction, and coupled to digital signal processing circuit 119. Alternately, the separated luminance and chrominance signals are further added to each other by adder 142 which mixes the outputs of D/A converters 140 and 141, thereby supplying such a video signal to external image receiver 199 as a record video signal for a monitor.

The video signal read by rotary magnetic head 107 is supplied to luminance/chrominance separating circuit 144 in the reproducing or play mode through change-over switch 139 and reproducing amplifying circuit 143. The luminance and chrominance signals separated by luminance chrominance separating circuit 144 are respectively supplied to automatic gain control circuit 115 and automatic color gain control circuit 116 through change-over switches 114y and 114c in a similar way to the case described above for the record operation. However, to the subsequent digitization by A/D converters 117 and 118, A/D-converts the luminance signal at frequency $1440f_H$ and the chrominance signal is A/D-converted at sampling frequency 4fd; four times the reproducing color subcarrier frequency which has been converted into the low frequency band.

A reproducing processing operation is then performed with respect to the A/D-converted luminance and chrominance signals within digital signal processing circuit 119. The luminance signal is first demodulated by FM demodulating circuit 145 and thereafter the sampling frequency of the luminance signal is converted by amplifying frequency converting circuit 146 from frequency $1440f_H$ to $720f_H$. The luminance signal is then supplied through the subsequent de-emphasis circuit 147 and change-over switch 148 and routed outside of digital signal processing circuit 119. The chrominance signal is decoded to a color difference signal by decoding circuit 131 and thereafter is resampled and converted back to the high frequency band by resampling circuit 149 through resampling circuit 132 and sampling frequency converting circuit 133 for adjusting a clock rate with respect to the reproducing luminance signal.

Thereafter, the chrominance signal is supplied to encoding circuit 150, where it is digitized and balance-modulated using a clock signal having frequency 4 fsc (four times the color subcarrier frequency). The signal is finally supplied through change-over switch 136 to the exterior of digital signal processing circuit 119.

The luminance and chrominance signals supplied to the exterior of digital signal processing circuit 119 are converted to analog signals by D/A converters 140 and 141, and are inputted in a separated (as opposed to composite) state. Alternately, the signals can be added to each other through added 142 to input a composite signal.

As mentioned above, this embodiment magnetic record reproducing apparatus 111 separates the luminance and chrominance components from the composite video signal at a stage of the analog signal prior to digital signal processing. Accordingly, there is more freedom to select a wider range of sampling frequencies to use in digital signal processing. Further, since the automatic gain control and automatic color gain control operations are separately performed after separation of luminance and chrominance, the ability of the record chrominance signal can be secured even when the signal level in voltage of the input chrominance signal is lowered. Further, the digitized luminance and chrominance signals are mixed and D/A-converted by a common D/A converter 137, thereby removing any dispersion which could be caused by dispersion with respect to the accuracy in D/A-converting separate signals.

An external processing operation can be performed between A/D converter 117 and pre-emphasis circuit 127 and between de-emphasis circuit 147 and change-over switch 148. Furthermore, the luminance signal is phase-locked with the horizontal synch signal and is sampled by a clock signal having frequency which is an integer times the horizontal synchronization frequency. Accordingly, it is possible to easily perform various functions of signal processing such as a noise reducing processing, a cyclic type, a processing for correcting a time axis and a processing for fitting and synthesizing a screen, by utilizing frame correlation or the like. Further, since the chrominance signal is phase-locked with the color subcarrier wave signal and is sampled by the clock signal having a frequency four times the chrominance subcarrier frequency, the structure of circuits such as decoding circuit 131, encoding circuit 150, etc., can be prevented from being large in size. Simultaneously, since external processing operation can be performed between sampling frequency converting circuit 133 and sampling frequency converting circuit 134 or resampling circuit 149, it is possible to still perform a special image processing for providing a special effect such as a strobe effect, mosaic effect, solarization effect, etc.

Furthermore, the A/D-converted chrominance signal is divided into a difference signal and thereafter is resampled by the clock signal which is phase-locked with the horizontal synch signal. Therefore, it is possible to perform an external processing such as cyclic noise reduction processing, time axis correcting processing, or special image processing mentioned above, by using the clock signal in the same system with respect to the luminance and chrominance signals.

As mentioned above, in the present invention, the luminance and chrominance signals are separately digitized. The frequency of the luminance signal is modulated within the digital signal processing circuit. The frequency of the chrominance signal is converted into the low frequency band as in the first embodiment and thereafter mixed with the luminance signal. The chrominance signal thus obtained is converted to an analog signal by the common D/A converter and is magnetically recorded. Accordingly, the automatic gain control and automatic color gain control operations can be respectively performed with respect to the luminance and chrominance signals at the analog signal stage prior to the A/D-conversion. Thus, an optimal gain control operation can be performed on every signal and the burden in operation of the digital signal processing circuit can be reduced. Further, even at the A/D-converting stage it is possible to perform the sampling operation by an optimal sampling frequency in consideration of respective occupied bands of the luminance and chrominance signals, and make the structure of each signal processing circuit small-sized within the digital signal processing circuit. Moreover, the digitized luminance and chrominance signals are mixed with each other and D/A-converted by common D/A converter so that there is no dispersion with respect to the accuracy in D/A-conversion every signal and the number of D/A converters used can be minimized.

Although only a few embodiments have been described in detail above, those of ordinary skill in the art will certainly recognize that many modifications are possible in the embodiments without materially departing from the teachings thereof. All such modifications are intended to be encompassed within the following claims.

What is claimed is:

1. A magnetic record reproducing apparatus comprising:
   two A/D converters for respectively digitizing luminance and chrominance signals as components of an analog composite video signal;
   a digital signal processing circuit, receiving the digitized luminance and chrominance signals from said two A/D converters, for modulating a frequency of the luminance signal and converting a frequency of the chrominance signal into a low frequency band, comprising:

a) clock means for producing a clock signal synchronized with a burst signal within said chrominance signal, and b) means for resampling said chrominance signal using said clock signal;

a first D/A converter, receiving the frequency modulated luminance signal and the low frequency converted chrominance signal, for converting said frequency modulated luminance signal and said low frequency converted chrominance signal to a first analog signal and using said first analog signal to perform a magnetic recording operation;

second and third D/A converters, receiving the digitized luminance and chrominance signals for converting the digitized luminance and chrominance signals to analog form; and means for mixing the luminance and chrominance signals outputted from the second and third D/A converters to produce a composite analog video signal.

2. A magnetic record reproducing apparatus as in claim 1, wherein said digital signal processing circuit further comprises:

means for obtaining a video signal to be recorded, and producing said luminance signal and said chrominance signal indicative thereof;

second clock producing means for producing another clock signal synchronized with a horizontal synchronization pulse within said luminance signal;

means for encoding said chrominance signal into a low frequency band, and combining said low frequency converted chrominance signal with said luminance signal to produce said analog signal to be recorded on said magnetic tape;

means for receiving a signal recorded from a tape, and producing a reproduced luminance signal and a reproduced chrominance signal indicative thereof;

means for demodulating said chrominance signal to convert back to said original chrominance signal frequency band according to said another clock signal;

means for processing said reproduced luminance signal; and means for producing a video output signal indicative of said reproduced luminance signal and reproduced chrominance signal.

* * * * *